US011766971B2

(12) United States Patent
Weinlich et al.

(10) Patent No.: US 11,766,971 B2
(45) Date of Patent: Sep. 26, 2023

(54) METHOD AND APPARATUS FOR OPERATING A CAMERA-MONITOR SYSTEM FOR A MOTOR VEHICLE

(71) Applicant: Continental Automotive GmbH, Hannover (DE)

(72) Inventors: Andreas Weinlich, Villingen-Schwenningen (DE); Thomas Smits, Straelen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/098,661

(22) Filed: Nov. 16, 2020

(65) Prior Publication Data
US 2021/0061184 A1 Mar. 4, 2021

Related U.S. Application Data

(63) Continuation of application No. PCT/EP2019/061624, filed on May 7, 2019.

(30) Foreign Application Priority Data

May 17, 2018 (DE) .................... 10 2018 207 762.2
Jun. 8, 2018 (DE) .................... 10 2018 209 192.7

(51) Int. Cl.
*B60W 60/00* (2020.01)
*B60R 11/02* (2006.01)
(Continued)

(52) U.S. Cl.
CPC ............ *B60R 11/0229* (2013.01); *B60R 1/00* (2013.01); *B60R 11/04* (2013.01); *H04W 4/46* (2018.02);
(Continued)

(58) Field of Classification Search
CPC ....... B60R 11/0229; B60R 1/00; B60R 11/04; B60R 2300/105; B60R 2300/301;
(Continued)

(56) References Cited

U.S. PATENT DOCUMENTS 11,347,218 B2 * 5/2022 Wang .................. G05D 1/0255
2007/0279250 A1 12/2007 Kume et al.
(Continued)

FOREIGN PATENT DOCUMENTS

DE 102006012773 A1 11/2006
DE 102008017833 A1 8/2009
(Continued)

OTHER PUBLICATIONS

International Search Report and Written Opinion dated Jul. 17, 2019 from corresponding International Patent Application No. PCT/EP2019/061624.
(Continued)

*Primary Examiner* — Howard D Brown, Jr.

(57) ABSTRACT

A method for operating a camera-monitor system for a motor vehicle, in which the camera-monitor system has a camera that is designed to provide an image of an environment of the motor vehicle and has a monitor for representing images from the camera comprises providing an image from the camera, ascertaining an attention-relevant object in the environment, temporarily changing at least one representation property of the image in dependence on the ascertained object to form a changed image, and representing the changed image on the monitor.

7 Claims, 5 Drawing Sheets

(51) Int. Cl.
*H04W 4/46* (2018.01)
*B60R 1/00* (2022.01)
*B60R 11/04* (2006.01)

(52) U.S. Cl.
CPC ... *B60R 2300/105* (2013.01); *B60R 2300/301* (2013.01); *B60R 2300/50* (2013.01); *B60R 2300/80* (2013.01)

(58) Field of Classification Search
CPC ............ B60R 2300/50; B60R 2300/80; B60R 2300/202; B60R 2300/305; B60R 2300/306; B60R 2300/307; B60R 2300/8093; H04W 4/46; G06K 9/00805; B60K 2370/193; B60K 2370/21; B60K 2370/152; B60K 2370/176; B60K 35/00; G08G 1/166; G08G 1/167; H04N 7/183
See application file for complete search history.

(56) References Cited

U.S. PATENT DOCUMENTS

| | | | |
|---|---|---|---|
| 2013/0201335 A1* | 8/2013 | Heinemann | G06T 11/001 348/148 |
| 2015/0232026 A1* | 8/2015 | Lueke | B60Q 9/00 701/1 |
| 2016/0063761 A1* | 3/2016 | Sisbot | B60W 50/14 345/633 |
| 2017/0067609 A1* | 3/2017 | Ichikawa | F21S 41/151 |
| 2017/0200197 A1* | 7/2017 | Brubaker | G06Q 30/0266 |
| 2020/0198660 A1* | 6/2020 | Belief | G06V 20/58 |
| 2020/0284883 A1* | 9/2020 | Ferreira | G01S 17/10 |
| 2021/0061184 A1* | 3/2021 | Weinlich | G08G 1/167 |

FOREIGN PATENT DOCUMENTS

| | | |
|---|---|---|
| DE | 102015011536 A1 | 3/2017 |
| DE | 102017220394 A1 | 5/2019 |
| JP | 2002025000 A | 1/2002 |
| JP | 2007323556 A | 12/2007 |
| JP | 2009205268 A | 9/2009 |
| JP | 2011180873 A | 9/2011 |

OTHER PUBLICATIONS

Notification of Reasons for Refusal (translated and original), dated Feb. 23, 2022, from corresponding Korean patent application No. 10-2020-7032890.

Japanese Decision of Refusal (original and translated) drafted on Apr. 19, 2022 and dated May 9, 2022 for the counterpart Japanese Patent Application No. 2020-564369.

Written Decision on Registration dated Aug. 29, 2022 from corresponding Korean patent application No. 10-2020-7032890.

* cited by examiner

METHOD AND APPARATUS FOR OPERATING A CAMERA-MONITOR SYSTEM FOR A MOTOR VEHICLE

CROSS REFERENCE TO RELATED APPLICATIONS

This U.S. patent application claims the benefit of PCT patent application No. PCT/EP2019/061624, filed May 7, 2019, which claims the benefit of German patent applications Nos. 10 2018 207 762.2, filed May 17, 2018 and 10 2018 209 192.7 filed Jun. 8, 2018, all of which are hereby incorporated by reference.

TECHNICAL FIELD

A method for operating a camera-monitor system for a motor vehicle is specified. Furthermore, an apparatus which is designed to carry out the method is specified.

BACKGROUND

Motor vehicles can have a camera and a monitor that represents images from the camera for a user of the motor vehicle. For example, mirror replacement systems are known in which the fields of view of conventional exterior mirrors are imaged by means of the camera and the monitor.

It is desirable to specify a method for operating a camera-monitor system for a motor vehicle which enables a reliable operation of the system. It is furthermore desirable to specify an apparatus for operating a camera-monitor system which enables reliable operation.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating a camera-monitor system for a motor vehicle and a corresponding apparatus which is designed to carry out the method is described herein.

According to at least one embodiment, the camera-monitor system has a camera. The camera is configured to record and provide an image of an environment of the motor vehicle. The camera-monitor system has a monitor for representing images from the camera.

An image from the camera is provided. An attention-relevant object in the environment is ascertained. At least one representation property of the image is changed in dependence on the ascertained object, so that a changed image is provided. The at least one representation property is temporarily changed. The changed image is represented on the monitor.

The camera-monitor system makes it possible to represent the environment of the motor vehicle on the monitor of the camera-monitor system, at least in part, for a driver of the motor vehicle. Conventional exterior mirrors can thus be dispensed with. The camera may be assigned to a longitudinal side of the motor vehicle and may be configured to provide an image of at least part of the environment that can conventionally be viewed by means of a conventional exterior mirror.

The attention-relevant object may be an object to which the attention of the user of the motor vehicle is intended to be directed and drawn. For example, the attention-relevant object is a pedestrian, an emergency vehicle with light, an overtaking vehicle, or another moving object that is situated in the sphere of influence of the motor vehicle.

By temporarily changing the representation properties of the image, the attention of the user is drawn to the monitor. For example, the brightness of the image is increased.

It is thus possible to alert the user to the fact that there is an object in the environment that should be observed and taken into consideration by the user of the motor vehicle. The representation property is not changed for a prolonged time period or permanently, but only temporarily. The image is then represented again with the unchanged representation properties. This prevents the user from being disturbed. For example, it can thus be avoided that the user is blinded by the monitor for a prolonged time period when driving at night. When driving at night, for example on a freeway, there is usually hardly anything shown on the monitor, except if a light such as another vehicle with headlights is approaching. The brightness of the monitor is adjusted so that the driver is not disturbed by too much movement and image noise in the monitor. An alert effect is nevertheless achieved by means of the temporary change in the representation property, for example an increase in the brightness of the monitor. Consequently, the user is made aware of the object even when using the mirror replacement system rather than a conventional exterior mirror.

According to at least one embodiment, the object is ascertained in the image provided by an object recognition method. For example, the image contents are evaluated based on software. Object recognition enables the identification of the attention-relevant object in the image provided.

According to at least one embodiment, the object is alternatively or in addition ascertained by at least one further sensor of the motor vehicle. For example, a radar, a LIDAR, other cameras, or distance sensors are used to ascertain the attention-relevant object in the environment.

According to at least one embodiment, the object is alternatively or in addition ascertained by means of vehicle-to-vehicle communication (car2car communication). The attention-relevant object and the motor vehicle can thus communicate directly with one another and exchange for example information relating to the location, speed, or planned routes with one another. This is done, for example, by a WLAN standard, via Bluetooth or another wireless communication interface.

Alternatively or in addition, a further object communicates with the motor vehicle in order to supply information relating to the attention-relevant object. For example, the further object supplies the position of the attention-relevant object to the motor vehicle.

According to at least one embodiment, changing the representation property comprises changing a brightness. Alternatively, or in addition, changing the representation property comprises changing a color. Alternatively, or in addition, changing the representation property comprises representing an additional graphic element. Further changes to the representation property that are suitable for drawing the attention of the user to the represented image are possible.

According to at least one embodiment, a representation region of the object is ascertained in the image on the monitor. The representation property is maintained in the representation region and changed outside the representation region. In this way, the attention-relevant object remains clearly visible. It is also possible to draw the attention to the image represented on the monitor. It can thus be ensured, for example, that a blue light from an emergency vehicle continues to be represented such that it is clearly visible in the representation region. Outside the representation region, changing the representation property attracts increased attention.

According to at least one embodiment, a threshold value for the attention relevance is ascertained. A value of the attention relevance of the object is ascertained. The representation property is changed if the ascertained value is greater than the threshold value. It is thus possible to adapt the representation property to the situation. This makes it possible, for example, that the representation property is changed only when this is actually necessary. For example, the threshold value is ascertained in dependence on the object.

Alternatively or in addition, the threshold value is ascertained, for example, in dependence on a user of the camera-monitor system. For example, the threshold value is ascertained in dependence on the user's ascertained ability to concentrate. For example, fatigue of the user is ascertained. For example, it is ascertained whether the user is relatively distracted, for example by using other devices of the motor vehicle, such as the radio. For example, the threshold value is set depending on whether the object is approaching quickly or slowly. It is also possible to set the threshold value in dependence on environmental variables, such as the time of day, brightness, traffic volume or other influencing factors.

According to at least one embodiment, a time period for changing the representation property is ascertained. The time period is ascertained in dependence on the object and/or on a user of the camera-monitor system. The representation property is changed for the ascertained time period. The changed image is represented within the ascertained time period. The image is represented with the unchanged representation property outside the time period, i.e. after the time period. The duration of the representation of the changed image is thus possible depending on environmental variables and units of the user.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further advantages, features, and developments can be gathered from the following examples, which will be explained in connection with the figures. Elements that are identical, of identical type and act identically may be provided with the same reference signs throughout the figures.

In the figures.

DETAILED DESCRIPTION

Figure 1:
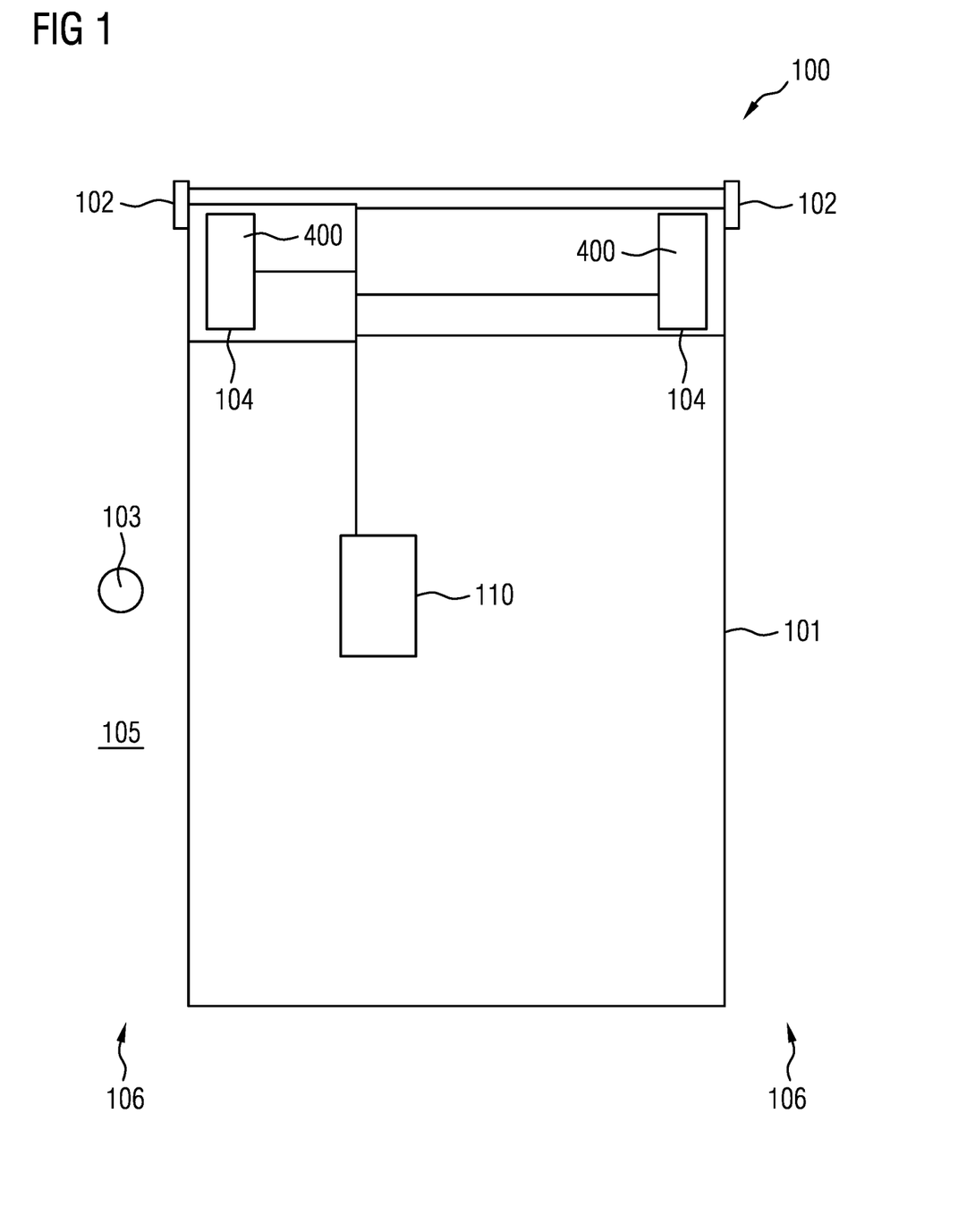
FIG. 1 shows a schematic illustration of a motor vehicle with a camera-monitor system according to one exemplary embodiment.

FIG. 1 shows a schematic illustration of a motor vehicle 101 according to one exemplary embodiment from above. The motor vehicle 101 is, for example, a truck. According to further exemplary embodiments, the motor vehicle is a bus and/or a passenger car.

The motor vehicle 101 has a camera-monitor system 100 as a mirror replacement system. The camera-monitor system 100 has a camera 102 per longitudinal side 106. The cameras 102 each serve to record part of an environment 105 of the motor vehicle 101.

According to further exemplary embodiments, a plurality of cameras, for example two or more cameras, are provided per side 106. According to further exemplary embodiments, the camera 102 is provided only on one side 106 of the motor vehicle 101. The camera 102 is assigned for example to a longitudinal side of the motor vehicle 101. The camera 102 is used for example to record a part of the environment 105 that lies in the field of view of conventional exterior mirrors.

The camera-monitor system 100 has two monitors 104. During operation, in each case a section of the associated environment 105 on the associated side 106 is represented on the monitor 104. For example, the image from the associated camera 102 is represented on the monitor 104. The images 400 represented on the monitors 104 thus differ from one another.

An apparatus 110 with which the cameras 102 and the monitors 104 are coupled for the transmission of signals is provided. The apparatus 110 is configured to control the cameras 102 and also the monitors 104. By way of example, the apparatus 110 is a control device or part of a control device of the motor vehicle 101. In particular, the apparatus 110 is configured for image processing.

Figure 2:
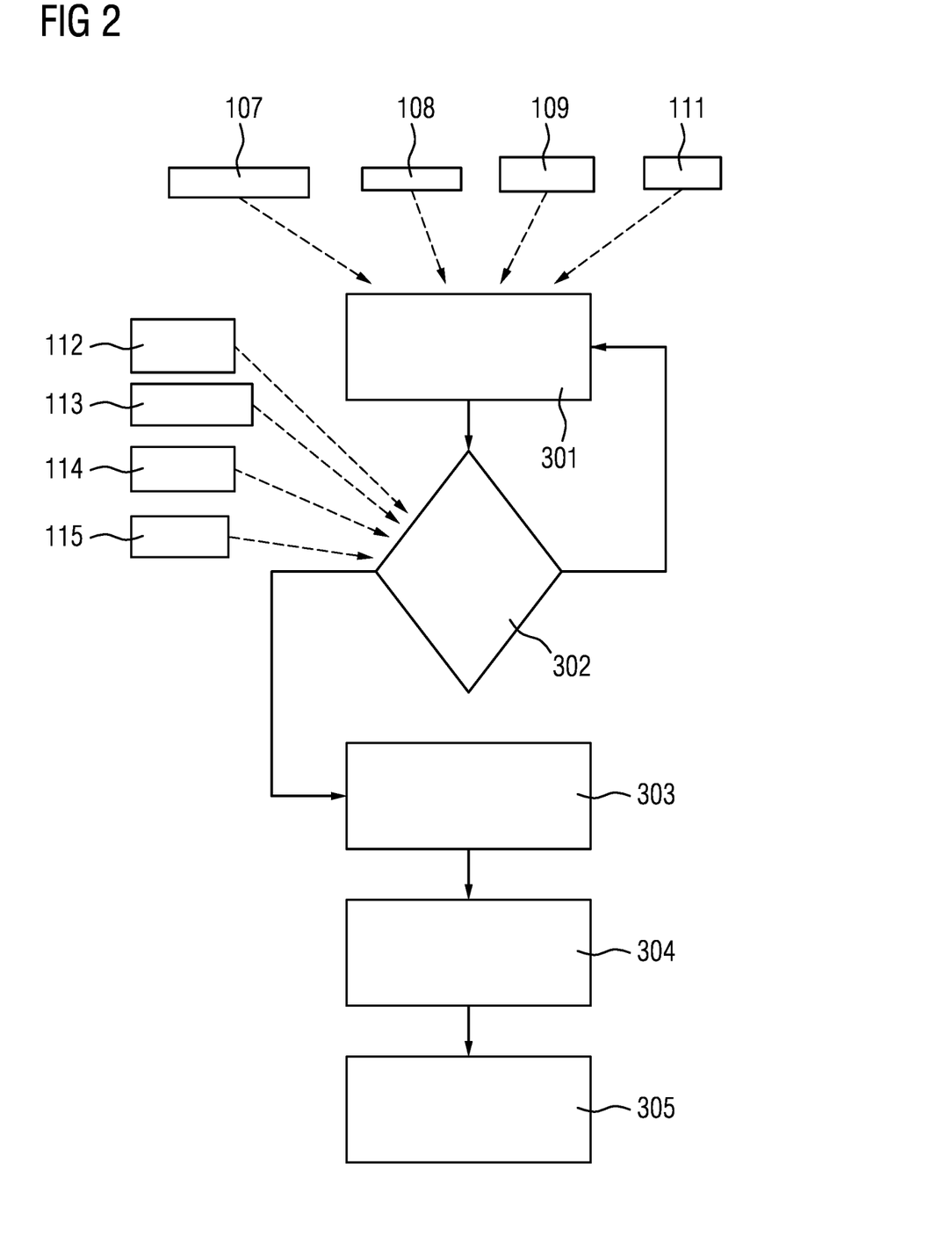
FIG. 2 shows a schematic illustration of a flow chart of a method according to an exemplary embodiment.

FIG. 2 shows a flowchart of a method according to an exemplary embodiment. In step 301, an object 103 (FIG. 1) is first recognized in the environment 105 of the motor vehicle 101. It is ascertained whether the object 103 is an attention-relevant object. An attention-relevant object is, for example, an object which poses a potential danger to the user of the motor vehicle 101 and/or an object to which the motor vehicle 101 poses a potential danger. An attention-relevant object is in particular a person, an approaching motor vehicle such as a motorcycle or, for example, another approaching object.

For example, a sensor system 107 of the motor vehicle is used to detect the attention-relevant object 103. For example, information relating to a CAN and/or to an Advanced Driver Assistance System (ADAS) unit or similar information sources are used. Brightness sensors, speed and other data can also be taken into account.

Alternatively or in addition, a further camera 108 is used to ascertain the object 103. Alternatively or in addition, the camera 102 of the camera-monitor system is used to ascertain the object 103. The camera 108 is, for example, an infrared camera. Alternatively or in addition, a further control device 109 of the motor vehicle 101 is used to recognize the object 103. Alternatively or in addition, information is received from information sources external to the vehicle by way of a communication interface 111 and taken into account when ascertaining the object 103. For example, information is received via a car2car or a car2x interface. Subsequently, in step 302, it is ascertained whether or not the user should be made aware of the object 103. If not, the method continues in step 301.

If it is ascertained in step 302 that the attention-relevant object 103 warrants a special notification, a representation property of an image 201 (FIGS. 3, 5 and 7) of the camera 102 or the representation on the monitor 104 is changed in step 303. For example, the brightness of the monitor is increased. Alternatively or in addition, the representation on the monitor is shaded in a specified color.

In step 304, the image is represented on the monitor 104 with the changed representation properties for a specified time period. The representation property is subsequently reset again in step 305, and the image 201 is represented unchanged on the monitor 104.

The decision in step 302 is made, for example, in dependence on visibility 112 of the motor vehicle 101. For example, at night and/or in fog and/or on a winding road, the visibility 112 can be reduced. Alternatively or in addition, the decision 302 is made in dependence on a history 113. The history 113 includes, for example, information relating to when and how often in the past the representation properties were changed in step 303.

Alternatively or in addition, the decision in step 302 is made in dependence on attention recognition 114. The attention recognition includes, for example, fatigue recognition of the driver. Alternatively or in addition, it is ascertained whether the driver is otherwise distracted, for example by using other devices of the motor vehicle 101. The decision in step 302 is alternatively or in addition made in dependence on a criticality 115. It is thus taken into account, for example, how acute a dangerous situation due to the object 103 is.

For example, an approaching vehicle is recognized as the object 103. This takes place, for example, by an automatic recognition system, for example by means of at least one of the elements 107, 108, 109, 111. Alternatively or in addition, an abrupt brightness reduction of the automatic camera system is also a possibility of recognizing an approaching vehicle with headlights. The brightness of the monitor 104 is then increased for a short time of, for example, 0.1 s to 5 s. Another time period is also possible, for example the time period is settable by a user or is specified in dependence on the ascertained object 103.

For example, the brightness of the monitor 104 is achieved by increasing the backlighting. Alternatively or in addition, the brightness of the representation on the monitor in general is increased, for example by increasing the light transmission of the liquid crystals in the monitor or a corresponding measure with other monitor technologies. The change in the representation on the monitor 104 attracts the driver's attention. This avoids that the object 103 becomes a danger. In addition, as the brightness is quickly reduced, the driver is no longer dazzled by the headlights of the approaching vehicle, for example. In another instance, on long journeys, the brightness of the monitor 104 can thus be reduced very strongly without danger, so as not to cause any distraction in normal dangerous situations. As soon as an attention-relevant object 103 is ascertained, the driver is intuitively made aware of it.

Another example of an attention-relevant object 103 is, in addition to the approaching vehicle, an approaching person.

Alternatively or in addition to increasing the brightness, it is possible to color the representation on the monitor 104 in one color for the specified time period. The driver's attention is further increased by the appropriate selection of a color, for example red. Alternatively or in addition, information is conveyed to the driver by means of the color selection. A specified color is used, for example, to indicate a low, medium, and high risk. Alternatively or in addition, the choice of color makes it possible to represent a low, medium, and high speed of the approaching vehicle. It is possible to color a frame around the entire display. Alternatively or in addition, it is possible to color a frame around the viewing area. It is also possible to color a frame around the object 103 in the representation on the monitor 104.

Alternatively or in addition, it is possible to represent various hazards, for example an approaching vehicle, a pedestrian, an overtaking maneuver, in a color-coded manner. In the case of an approaching vehicle with blue light, for example, a frame can be coded in blue. According to further exemplary embodiments, a color other than blue is used so that the actual blue light is also represented and recognized correspondingly well.

Alternatively or in addition to the color coding, a gradation of the increase in brightness is used according to exemplary embodiments for the stated application purposes, for example in steps, low, medium high, or through a continuous change in the brightness.

If a monitor 104 that can represent a high brightness is used, it is possible to use the method during the day without restrictions.

The information relating to the dangerous situations, that is to say in particular for ascertaining the object 103, is provided by the camera-monitor system 100 according to an exemplary embodiment by way of system-internal sources. Alternatively or in addition, the information is provided by external warning systems. This relates, for example, to vehicle-internal information that is provided for example by means of CAN or an ADAS unit or similar information sources, for example by means of the sensor 107, the camera 108 and/or the control device 109. Alternatively or in addition, information external to the vehicle is taken into account, which is transmitted to the motor vehicle 101 for example via a car2car communication or a car2x communication. This makes it possible for the driver to be warned, for example, of an approaching vehicle and/or of obstacles located on the route that are not yet recognizable by or visible to the camera 102 or the other sensor systems of the motor vehicle 101, for example that is to say in bends behind or in front of the vehicle.

To ensure that the driver is not constantly disturbed by the visual alert when driving at night and in relatively heavy traffic, different threshold values dictating when the system should alert the driver can be defined. These are taken into account in particular in step 302. The threshold value is specified by the driver, for example. Alternatively or in addition, the threshold value may be configured ex works.

According to at least one embodiment, the setting of the threshold value takes into account the attention of the driver. If the driver is distracted, for example by operating the navigation system or the radio for a relatively long time, the threshold value is set lower, for example. The driver is thus alerted earlier. Alternatively or in addition, the attention is assessed by way of fatigue recognition, which is implemented in the camera-monitor system 100 itself or is provided by external control devices, in particular by the attention recognition 114. It is also possible to ascertain the viewing direction of the driver and, in particular, to point out the object 103 if the driver is looking in a different direction.

Alternatively or in addition, the threshold value is set in dependence on the criticality 115. For example, detailed information relating to the object 103 is available through object recognition and other control devices and/or through car2car communication. A critical situation is ascertained depending on the information relating to the object 103, in particular a motion vector and a trajectory derived therefrom, a vehicle type, an illumination state and other properties, depending on the own trajectory and lane and further information relating to the motor vehicle 101. According to exemplary embodiments, the threshold value is set correspondingly high in order to suppress an alert if necessary or to issue an alert accordingly in the event of a potential danger. For example, the threshold value is set as a function of a speed of an approaching object 103. For example, a vehicle is approaching at high speed from behind, and the driver of the motor vehicle 101 is alerted by the change in the representation to the image on the monitor 104.

Alternatively or additionally, it is possible to set the threshold value as a function of visibility of the object 103. For example, the object 103 is hidden behind a long bend. The position transmitted using car2car communication is taken into account and combined using detailed map data, for example, with the result that information about the long bend is available.

As an alternative or in addition, the object 103 is ascertained in the image 201 from the camera 102 of the camera-monitor system 100 by means of object recognition.

Alternatively or additionally, it is ascertained by means of the further control device 109 whether the object 103 should already be visible to the driver of the motor vehicle 101. For example, this is done using radar sensors or LIDAR.

According to exemplary embodiments, the history 113 is considered with regards to the manner in which and when the representation property is to be changed and an alert be issued thereby. If the motor vehicle 101 is moving on a freeway, for example, it is possible that no other car and thus no object 103 will approach for a relatively long time. The threshold value is therefore set comparatively low in order to issue an alert early. When driving on the freeway, during which time no car has approached for a relatively long time, it is thus assumed in particular that the driver's concentration is lower than when there is a high volume of traffic. If another vehicle follows relatively soon after the previous alert, the next alert could for example be correspondingly less intense or even be dispensed with.

Figure 3:
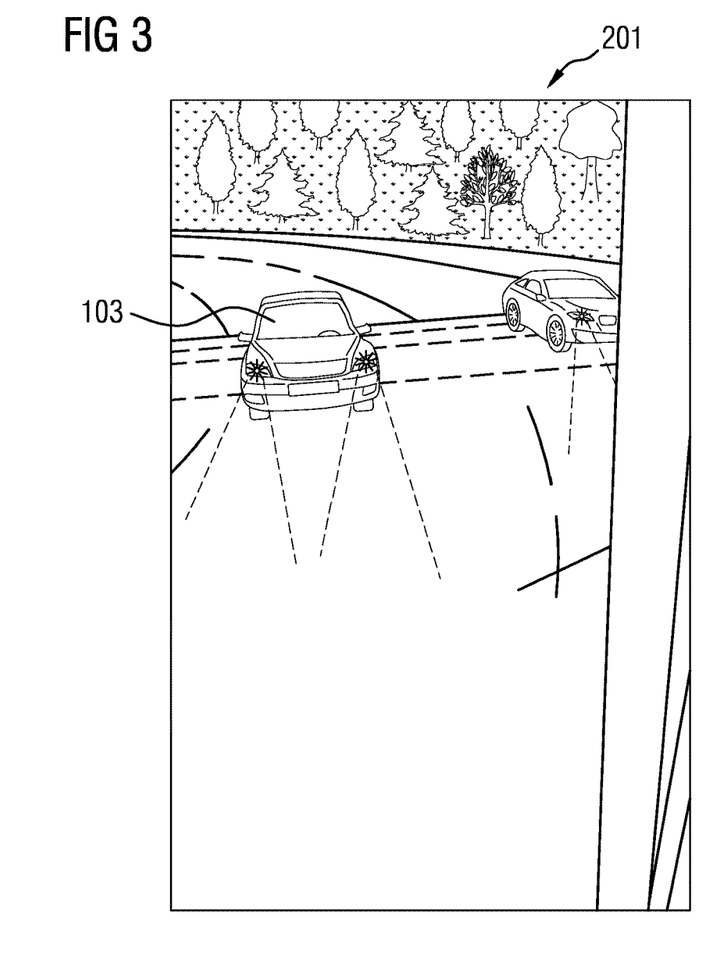
FIG. 3 shows a schematic illustration of an image according to one exemplary embodiment.

FIG. 3 shows the image 201 from the camera 102 with unchanged representation properties according to an exemplary embodiment.

Figure 4:
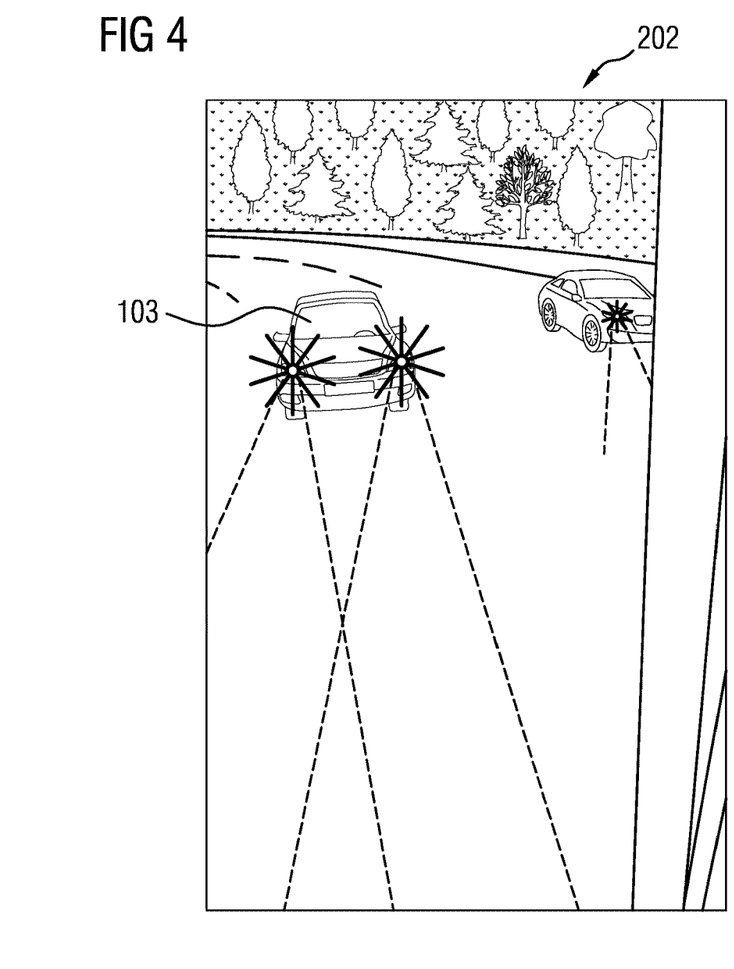
FIG. 4 shows a schematic illustration of the image of FIG. 3 with changed representation properties.

FIG. 4 shows a changed image 202 according to an exemplary embodiment. The changed image 202 is represented on the monitor 104 in order to draw the driver's attention to the attention-relevant object 103 or to alert the driver. FIG. 3 shows the conventional representation of the image 201, in which the camera-monitor system 100 selects the representation properties in order to be able to represent as many details of the environment 104 as possible. For this purpose, for example, the brightness in the region of the headlights of the approaching motor vehicle 103 is reduced. In order to still notify the driver of the motor vehicle 101 of the approaching vehicle 103, similar to a conventional side mirror, the brightness of the monitor 104 is increased. This is shown in FIG. 4. The changed image 202 with the changed representation properties simulates for example a momentary glare that could occur with a conventional side mirror.

Figure 5:
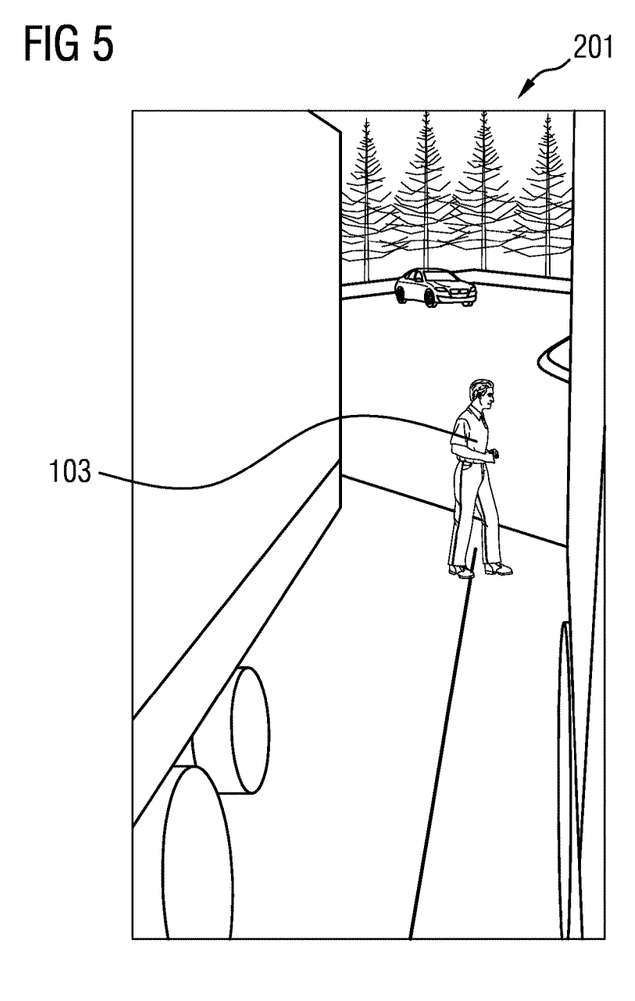
FIG. 5 shows a schematic illustration of an image according to one exemplary embodiment.
Figure 6:
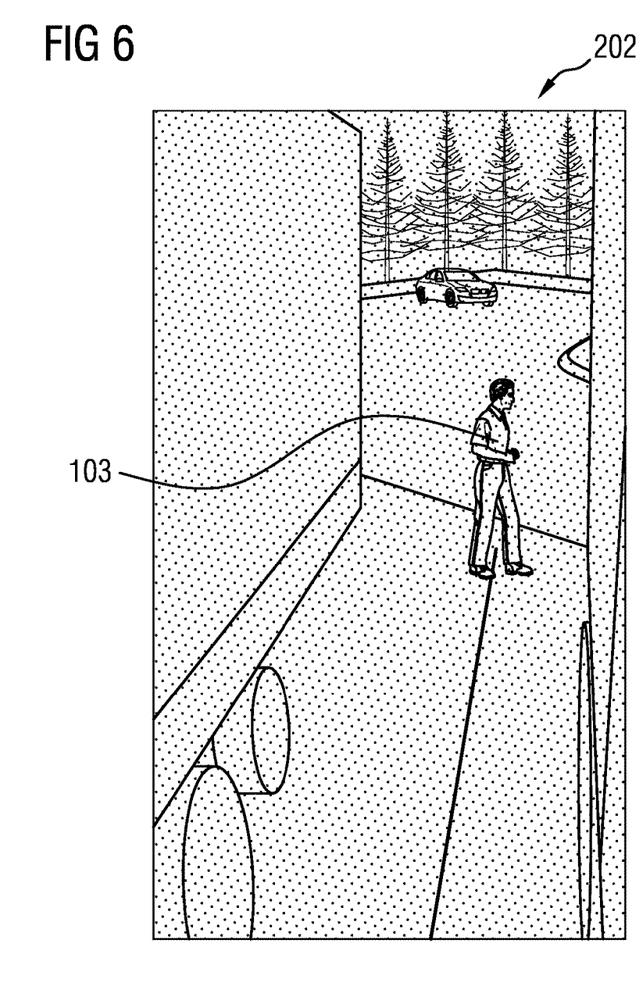
FIG. 6 shows a schematic illustration of the image of FIG. 5 with changed representation properties.

FIG. 5 shows the image 201 according to a further exemplary embodiment. The attention-relevant object 103 is a pedestrian in the region of the motor vehicle 100. As shown in FIG. 6, the representation properties are changed in such a way that the changed image 202 represented in the monitor 104 is shaded in color. For example, a yellow haze is represented in order to notify the user of the motor vehicle 101 of the person 103 in the region of the motor vehicle 101 and to alert the user to said person.

Figure 7:
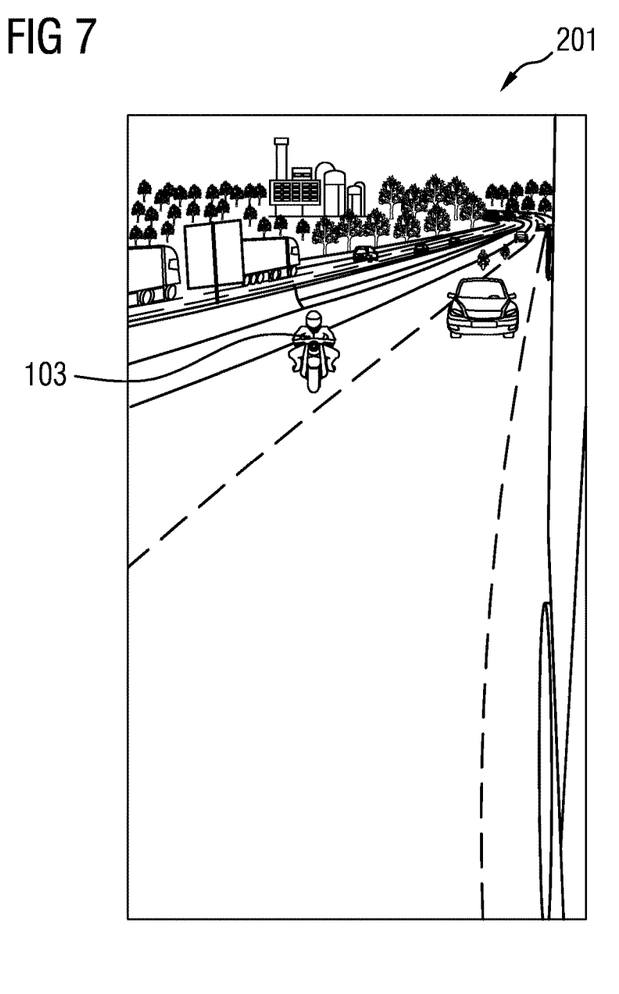
FIG. 7 shows a schematic illustration of an image according to one exemplary embodiment.

FIG. 7 shows the image 201 according to a further exemplary embodiment. The attention-relevant object 103 is a motorcycle approaching from behind. The representation properties are changed, and the changed image 202 is represented, as is shown by way of example in FIG. 8. In order to alert the user of the motor vehicle 101, a graphic element 203 is displayed, for example. In the exemplary embodiment shown, the graphic element 203 is a frame, in particular in a specified color, which is represented on the monitor 104. For example, the frame 203 is represented on the outer periphery of the monitor 104. According to further exemplary embodiments, the frame is represented in the region of the safety-relevant object 103.

Figure 8:
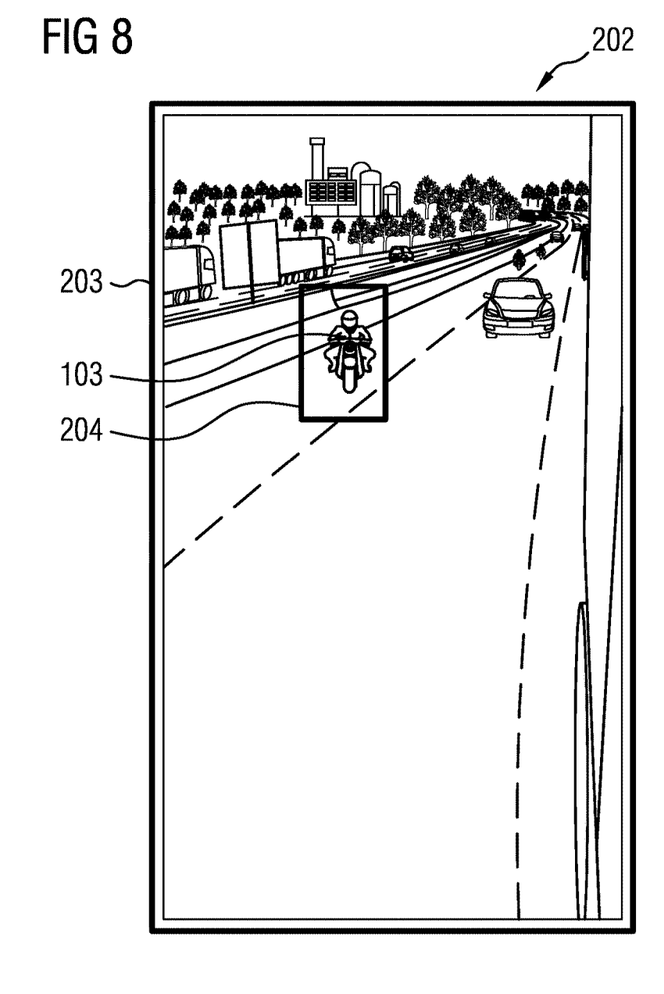
FIG. 8 shows a schematic illustration of the image of FIG. 7 with modified representation properties.

Alternatively or in addition, a representation region 204 is ascertained, in which the safety-relevant object 103 is represented on the monitor 104. The image 202 is changed only outside of the representation region 204 in order to alert the user of the motor vehicle 101. The unchanged image 201 is represented within the representation region 204. The attention-relevant object 103 is thus represented with as much detail as possible. This prevents important information from not being displayed on the monitor 104 due to the change in the representation property, for example a blue light of an emergency vehicle.

The different examples described for changing the representation properties can be combined as desired. For example, in the changed image 202 according to FIG. 8, the representation outside the representation region 204 is shaded in color, as is explained in connection with FIG. 6.

The described method and the described camera-monitor system 100 enable the driver of the motor vehicle 101 to be informed of dangers without the driver having to look directly at one of the monitors 104. Different types of dangerous situations are additionally communicated with the aid of the color coding or brightness coding. In addition, the dazzling effect of approaching vehicle headlights is avoided. This increases the safety both for the driver and for other people. It is also possible to inform the driver of movements outside the vehicle 101 when the vehicle is stationary, for example as a theft alarm system. Alternatively or additionally, it is possible to alert the driver to an approaching vehicle before the driver exits the vehicle. This is triggered, for example, by reaching for the door handle.

It is also possible to combine the method described with an acoustic alert method. Such a method is described, for example, in German patent application 102017220394.3 with the title "Method and device for operating a driver assistance system for a motor vehicle and motor vehicle." It is thus possible to fully notify the driver of an attention-relevant object.

The environment 105 is rich in detail and easily visible in the monitor 104. It is possible to reduce the display brightness sufficiently, especially at night. Nevertheless, an alert effect is implemented by virtue of the fact that the representation on the monitor 104 is briefly changed.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating a camera-monitor system for a motor vehicle comprising:
   providing an image of an environment of the motor vehicle from a camera;
   ascertaining an attention-relevant object in the environment with a control device by;
      ascertaining a threshold value for an attention relevance, wherein the threshold value depends on at least one of a user of the camera-monitor system, and a history of the change in the representation and environmental variables; and
      ascertaining a value of the attention relevance of the object;
   changing temporarily at least one representation property of the image in dependence on the ascertained object to form a changed image by changing a brightness when the ascertained value is greater than the threshold value; and
   representing the changed image on a monitor.

2. The method as claimed in claim 1, wherein ascertaining the object further comprises using an object recognition method in the provided image.

3. The method as claimed in claim 1, wherein ascertaining the object further comprises using at least one further sensor of the motor vehicle.

4. The method as claimed in claim 1, wherein ascertaining the object further comprises using vehicle-to-vehicle communication.

5. The method as claimed in claim 1, further comprising:
   ascertaining a representation region of the object in the image on the monitor;
   maintaining the representation property in the representation region; and
   changing the representation property outside the representation region.

6. The method as claimed in claim 1, wherein temporarily changing the representation property further comprises:
   ascertaining a time period for the change in dependence on one of the object and a user of the camera-monitor system,
   changing the representation property for the ascertained time period;
   representing the changed image within the ascertained time period; and
   representing the image with the unchanged representation property after the time period.

7. The method as claimed in claim 1, wherein the camera is associated with a longitudinal side of the vehicle and wherein the monitor is located within the vehicle on the same longitudinal side as the camera.

* * * * *